March 1, 1938. G. T. BALFE 2,109,814
GASKET
Filed Nov. 9, 1936

Inventor
George T. Balfe
By Cushman Darby & Cushman
Attorneys

Patented Mar. 1, 1938

2,109,814

UNITED STATES PATENT OFFICE 2,109,814

GASKET

George T. Balfe, Detroit, Mich., assignor to Detroit Gasket & Mfg. Co., Detroit, Mich., a corporation of Michigan Application November 9, 1936, Serial No. 110,005

3 Claims. (Cl. 288—1)

This invention relates to gaskets and is particularly intended for automotive use.

It has long been common in the case of manifold gaskets to flange the gasket adjacent the service openings and fit the flanges in the passages in the block of the engine. The purpose of this construction was to reenforce the gasket as well as to insure that it will remain firmly in place. Such gaskets, however, usually present a metal surface to the metal surface of the engine and a tight seal is not always possible.

With the present invention, and in order to overcome this objection the gasket is formed with a metal layer and a cushion layer of asbestos and the flanges formed therefrom are presented to the walls of the conduits in the engine so as to have the cushion material adjacent the metal wall surface. As a result, a much more perfect and reliable seal is obtained and the opportunity for blowing out of the gasket is considerably reduced.

In this connection, using a gasket consisting of a metal layer and a cushion layer, the exposed free edge of the flange is flared or curved so as to provide a smooth, continuous streamline effect protecting the end of the gasket and directing gases away from the wall of the opening as well as overcoming formation of high pressure areas.

The invention may take many forms as, for example, the metal layer may have cushion material on each side thereof, and in the drawing, I have illustrated a preferred embodiment of the invention.

Referring to the drawing.

Figure 1:
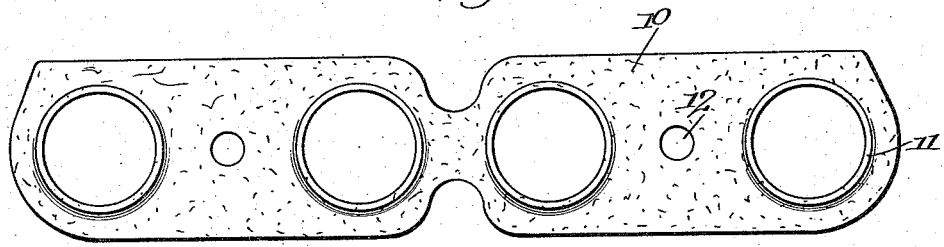
Figure 1 is a top plan view of a gasket constructed in accordance with this invention.
Figure 2:
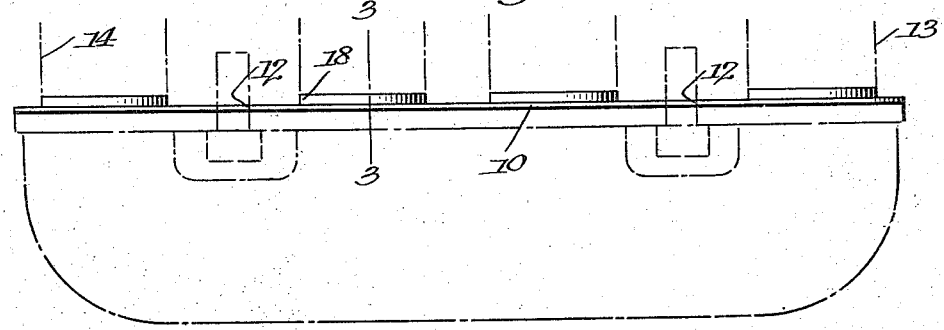
Figure 2 is an edge view showing the gasket of Figure 1 applied between the manifold and the cylinder block of the engine.
Figure 3:
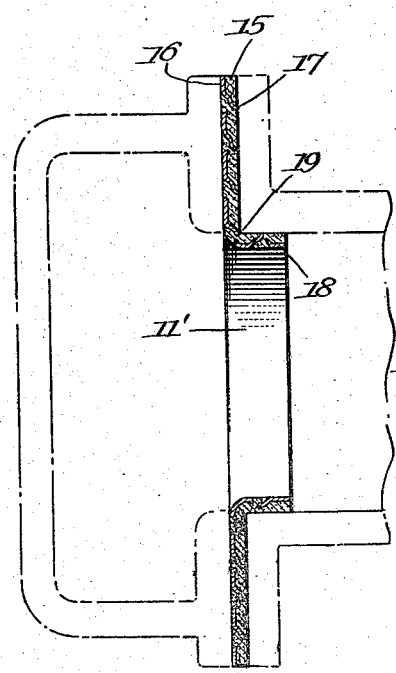
Figure 3 is an enlarged cross sectional view on the line 3—3 of Figure 2.

The preferred construction of the gasket is in accordance with my United States Patents 1,927,450 and 1,726,140, wherein, there is described and shown the use of a metal layer having struck-up projections or tangs thereon and a cushion layer such as asbestos in which said projections are embedded throughout the area of the gasket, forming barriers and imparting to the gasket a heat transferring characteristic.

While in the present drawing, I have illustrated a gasket having cushion material on one side only, the metal layer may be provided with tangs struck up from opposite sides with cushion layers associated therewith so that the metal layer is sandwiched between the cushion layers.

The numeral 10 indicates a manifold gasket of this general type having service openings 11 and bolt holes 12. The numeral 13 indicates the block of the usual internal combustion engine having intake and exhaust ports 14.

The gasket has a cushion layer 15 and a metal layer 16, the latter provided with projections 17 embedded in the cushion layer as shown. At one or more of the service openings, the laminated gasket material is pressed out or otherwise formed from the metal side to provide a circular flange 18. This flange extends away from the plane of the gasket and defines an extended opening 11', the inner wall of which is formed by the metal layer 16 and the outer layer by the cushion material 15.

When the gasket is applied to the engine, the cushion material layer 15 of the flange 18 engages and seats against the wall of the opening in the engine and produces a firm seal and one by which inequalities in the wall surface of the opening in the engine are thoroughly sealed as well as the corner 19. This is very important in that heretofore metallic surfaces were used and the seal was not uniformly tight enough to prevent gases from working their way up on the inside of the gasket resulting in ultimate blowing. The present invention as pointed out overcomes this possibility.

Figure 4:
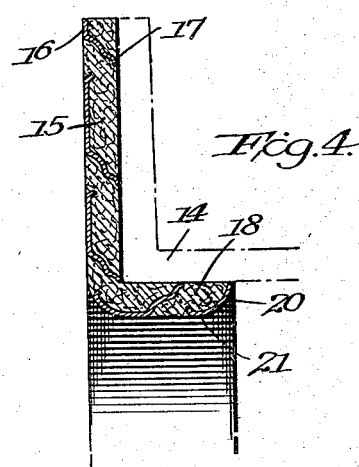
Figure 4 is an enlarged sectional view of a modified form of the invention showing in section, a part of the gasket positioned in the opening in the block of the engine.

Referring to Figure 4, in pressing the flanges 18, I prefer to use a die member having a form so that the end 20 of the flange will be rounded and compressed as shown at 21 to present a streamline effect. This exposed metallic surface 20 will serve to direct gases away from between the flange and the wall of the opening in the engine and by enclosing the asbestos will protect the edge of the gasket.

The invention presents a very simple solution to what has heretofore constituted an extremely difficult problem and the forming of the gasket as will be observed, is inexpensive and does not require any complicated operations.

I claim:—

1. A gasket for sealing the joint between opposed surfaces having openings therethrough, said gasket having a service opening therein and comprising a layer of cushion material and a layer of metal, the layer of metal having projections struck up therefrom and embedded in the cushion material, and an integral annular flange extending up from the plane of the gasket on the cushion side and adapted to be inserted in the opening of one of the joint surfaces, said flange having its inner wall presenting a metal surface and its outer wall presenting a substantially coextensive layer of cushion material.

2. A gasket for sealing the joint between opposed surfaces having openings therethrough, said gasket having a service opening therein and comprising a layer of cushion material and a layer of metal, the layer of metal having projections struck up therefrom and embedded in the cushion material, and an integral annular flange extending up from the plane of the gasket on the cushion side and adapted to be inserted in the opening of one of the joint surfaces, said flange having its inner wall presenting a metal surface and its outer wall presenting a substantially coextensive layer of cushion material, the outer edge of said flange being curved inwardly and compressed to present a rounded end surface.

3. A gasket for sealing the joint between opposed surfaces having openings therethrough, said gasket having a service opening therein and comprising a layer of metal and layers of cushion material on opposite sides thereof, the layer of metal having projections struck up therefrom and embedded in the cushion material layers, and an integral annular flange extending up from the plane of the gasket on one side thereof and adapted to be inserted in the opening of one of the joint surfaces, said flange having its inner and outer walls presenting layers of cushion material within which is disposed a coextensive layer of the metal.

GEORGE T. BALFE.